Figure 1:
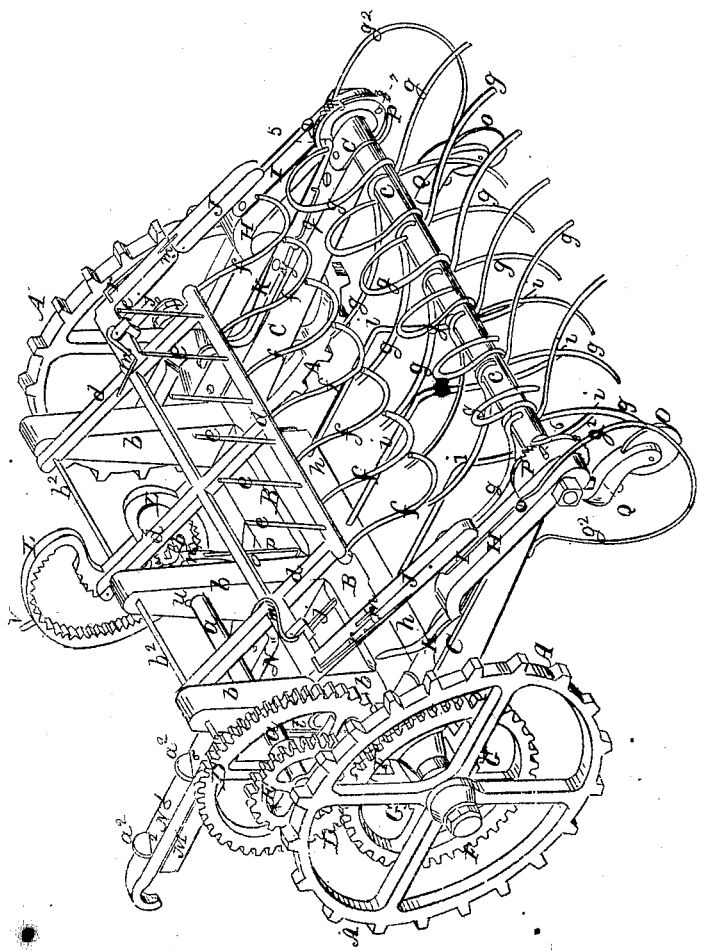

A. J. Preston,
Hay Loader.

No. 30,423.

2 Sheets Sheet 1.

Patented. Oct. 16, 1860.

A. J. Preston
Horace S. Phelps
Ransom Clark

A. J. Preston,
Hay Loader.
No. 30423
2 Sheets. Sheet 2.
Patented. Oct. 16. 1860.
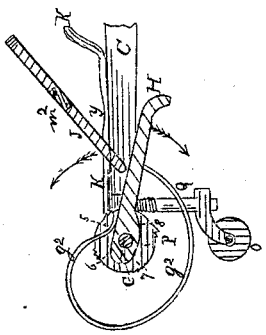
Figure. 5.
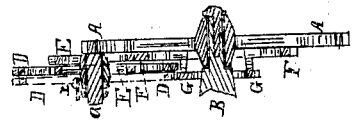
Figure. 6.
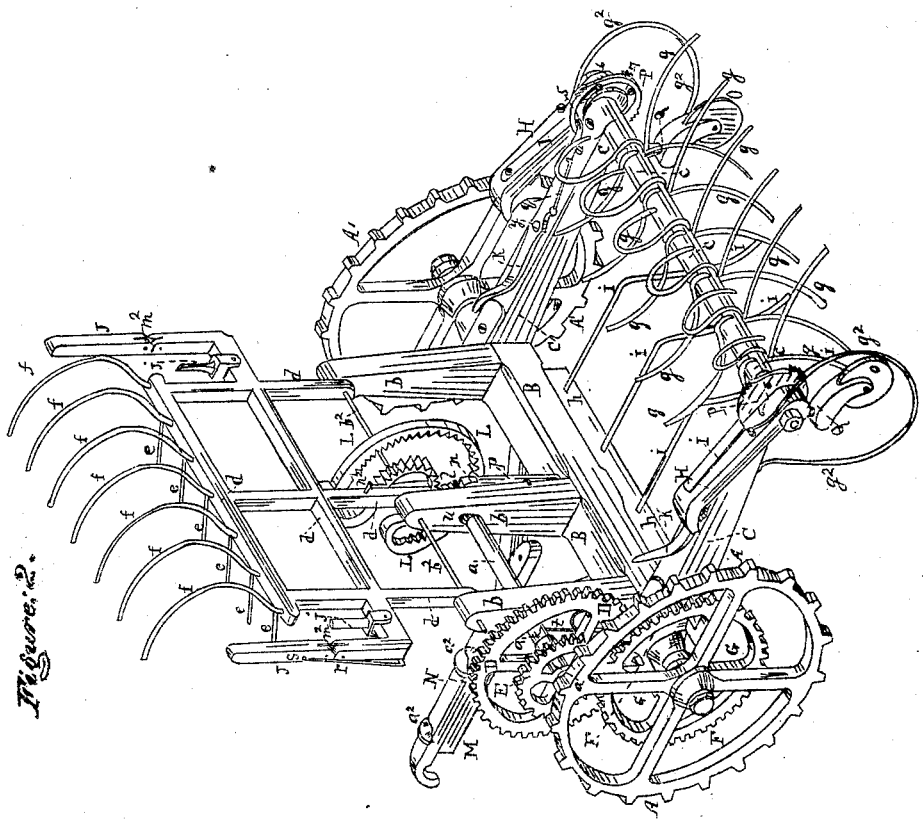
Figure. 2.
Figure. 3.
Figure. 4.

UNITED STATES PATENT OFFICE.

A. J. PRESTON, OF EAST GUILFORD, NEW YORK.

IMPROVEMENT IN MACHINES FOR RAKING AND PITCHING HAY.

Specification forming part of Letters Patent No. 30,423, dated October 16, 1860.

*To all whom it may concern:*

Be it known that I, A. J. PRESTON, of East Guilford, county of Chenango, in the State of New York, have invented certain new and useful Improvements in Machines for Raking and Pitching Hay; and I do hereby declare that the following is a full and exact description thereof, reference being had to the accompanying drawings, and to the letters of reference marked thereon.

My invention relates to a novel apparatus for raking hay and loading it into any desired vehicle; and my invention consists in an improved apparatus, which is connected or coupled onto a wagon or cart, and which rakes and elevates or pitches the hay into the wagon, as will be hereinafter described.

To enable those skilled in the art to make and use my invention, I will proceed to describe the construction and operation of my improved machine, referring by letters to the accompanying drawings, forming part of this specification, and in which—

Figure 1 is a perspective view of my improved machine for raking and pitching hay. Fig. 2 is another perspective view of the same with the parts in a changed position; and Figs. 3, 4, 5, 6 are detail sections, which will be more alluded to hereinafter.

In the different views the same parts are indicated by the same letters.

A A' are two main carrying-wheels, which are arranged one on each ends of an axle, B, which is provided with three upright standards, $b\ b\ b$, near the ends of the axle B, and inside of the wheels A and A' are hung two arms, C C, which carry the rake-shaft $c$, and which are supported at their rear ends by two caster-wheels, $o\ o$, hung in pivoted stands Q Q. On the ends of shaft $c$ are fastened two perforated ratchet-wheels, P P, and immediately outside said ratchet-wheels are hung loosely on shaft $c$ two vibrating arms, H H, provided with pawls I I, which catch into the notches of wheels P. The arms H are continually pulled upward by the springs $g^2\ g^2$. On shaft $c$ are arranged four rows of teeth, $g\ g$, &c., for gathering or raking up the hay, and which are intermittently rotated by shaft $c$, as will be presently explained.

K K are two vibrating check-levers, which hold the shaft $c$, as will be presently described. On the under side of axle B is hung a horizontal bar, $h$, from which extend a series of teeth, $i$, that drag along the ground, and against which the teeth $g$ of the rake gather the hay, and which serve as guides to keep the hay on the rake-teeth. On the inner face of wheel A (which may be termed the "main driving-wheel") are formed or secured a gear, F, and pinion G, which mesh into gear D and pinion E, in a manner to be described. The gears D and E are arranged on one end of the shaft $a$, which is hung in slotted bearings $u$ in the standards $b\ b$. On the other end of shaft $a$ is a pinion, $l$, which meshes into and drives the double sector L, which carries the pitcher-frame $d$, and which, together with the frame $d$, is hung on the horizontal shaft $b^2$. This pitcher-frame $d$ is provided with two sets of fingers or teeth, one set (marked $e$) projecting at nearly right angles with the frame; the other set, $f$, curved and projecting in nearly a plane with said frame $d$. The middle cross-bar of frame $d$ extends a short distance beyond each side of the frame and has secured to each end a jointed arm, J, and a shipper-finger, $j$. The arms J J are jointed so as to bend readily when their ends are pushed in one direction, but be rigid when pushed in an opposite direction, and are held in a distended condition by means of springs $r$. The shipper-fingers $j$ are each so arranged on a pivot, in combination with a spring, $m$, (see Fig. 1,) that they can be vibrated in one direction only and are always retained in a given position when not disturbed by the spring $m$.

The tongue of the apparatus is made of a solid or fixed tongue-piece, M, with sliding bar N on top of it and secured to it by thumb-screws or bolts $a^2\ a^2$ passing through holes 1 2 3 in the pieces M and N. On the forward end of bar N is a hook, which connects into a staple or ring in the hind axle of the wagon to be loaded. The object of the sliding bar and series of holes 1 2 3 with bolts $a^2\ a^2$ is that the tongue of the apparatus may be lengthened or shortened at pleasure to adapt it to different kinds and sizes of wagons, and also, if deemed expedient, to load more evenly at both ends of a long wagon.

As before mentioned, the arms C are hung on axle B so as to turn thereon, and are supported at their rear ends by caster-wheels O. The standards Q of said casters are made with a screw-thread, so as to raise and lower the rear ends of arms C for the purpose of adjusting the rake to different heights to suit the ground over which it has to run, it being necessary to have the teeth $g$ run farther from the surface of the ground when it is very rough than when it is smooth. The construction and operation of arms J and H will be best understood by reference to Figs. 1 and 5. The latter is a partial vertical section taken in a plane passing through the center longitudinally of said arms. The arm J is hinged at $m^2$ so that it can fold downward at its extremity, but not upward, and is retained by a spring, $r$, pressing against a pin, $s$, in a distended condition. In each of the Figs. 1 and 5 the arms J and H are represented in that relative position in which they would be when the pitcher $d$ is descending to receive a charge of hay; and it will be seen that the end of arm J is pressing onto arm H and forcing arm H downward, as indicated by the blue arrow at Fig. 5, and the arm J continues to force down arm H until it passes by its end, and in its return motion the said arm J folds up to get by said arm H. As the arm H is forced downward, as just described, its spring $g^2$ is partially coiled or wound up, and would cause said arm, when released from the pressure of arm J, to recoil; but said arm is prevented from returning by its pawl I catching into the notches of wheel P, which is held fast by the end of lever K, locked into one of the holes 5 6 7 8; but after the ends of arms J have gone a short distance past ends of arms H the fingers $j$ come in contact with the forward ends of levers K, and, vibrating them on their axes $y$, (see Fig. 2,) force their rear ends out of the holes in wheels P, releasing said wheels, when the spring $g^2$ causes the arms H to fly back, carrying the wheels P and their shaft $c$ around one-quarter turn, which of course gives a like motion to the sets of raking-teeth $g$.

In order to clearly explain the mechanism by which the rotation of driving-shaft $a$ is caused to impart a vibratory motion to the pitcher $d$, it will be necessary to refer particularly (in connection with the other figures) to Figs. 3 and 4, which are skeleton sectional views, showing the double sector L and its connections in two different positions.

$n$ and $o^2$ are two bars pivoted at their lower ends to studs 10 and 11, which project from the side of the middle standard $b$. The shaft $a$ is capable of being adjusted to two different positions vertically, and is continually pulled downward by a spring, $t$. (See Figs. 1 and 2.) When the shaft $a$ is in its highest position it is held up fast by the bar $n$, the upper end of which is forced under the shaft $a$ by a spring, $p$, and when shaft $a$ is in its lowest position it is held fast down by the upper end of bar $o^2$, which is hook-shaped, and is forced over top of said shaft by a spring, $p'$. When the shaft $a$ is thrown into its highest position, its pinion $l$ meshes into the convex set of teeth of sector L, and when thrown into its lowest position it meshes into the concave set of teeth, and when changed from one to the other of these sets of teeth the direction of rotation-sector L, on its shaft $b^2$, is of course reversed. The shipping of the shaft $a$ up and down is thus effected, viz: Suppose the pinion in mesh with concave set of teeth, as seen at Fig. 3, and sector rotating in the direction indicated by arrow in Fig. 3, when the sector gets round into position seen at Fig. 4 the pin $n^2$ strikes against the top of lever $o^2$ and pushes it from over shaft $a$, as shown at Fig. 4. At the same time elevated point at 31 runs under pinion $l$ and lifts it up, when it meshes into convex set of teeth and out of mesh with the concave set, and the rotation of sector L is reversed, and it turns back in the direction indicated by arrow in Fig. 4. When the sector has traveled the proper extent of rotation in this direction the pin $r$, projecting from its periphery, strikes a pin that projects from the side of bar $n$ and knocks said bar from under the shaft $a$, when said shaft is pulled down by spring $t$ and pinion $l$ thrown in gear with concave set of teeth again, and so on as long as the shaft $a$ is kept rotating the frame $d$, attached to sector L, is kept vibrating. The shaft $a$ is shown as being driven by gear F meshing into pinion E, and the gear D and pinion G are out of mesh. When it is desired to diminish the speed of the pitcher the thumb-screw $x$ (see Fig. 6) is loosened and the hub to which gear D and pinion E are fast is slid along on shaft $a$, bringing gear D into mesh with pinion G, and throwing pinion E out of gear with gear F. The change of speed effected by sliding the collar or hub to which gear D and pinion E are secured is illustrated in red lines at Fig. 6, which is a skeleton vertical section, showing the gears and ends of their shafts.

From what has been said of the construction and functions of the several parts of the apparatus, the following brief explanation will make clear the whole operation of my improved machine. The shaft $c$ or rake-head being adjusted by the screw caster-wheel carriers Q Q to the proper height to suit the condition of surface to be traveled over, and the tongue M N being adjusted to the proper length to suit the wagon to be loaded, the said tongue is connected to the rear end of a wagon, by which it is drawn over the field. As the apparatus travels along, the wheel A', through the medium of gears E and F, drives the shaft $a$, and rotary motion of said shaft imparts, in the manner already described, the proper vibratory motion to the pitcher-frame $d$. The teeth $g$ of the rake, passing along close over the surface of the ground, gather the hay against the guides $i$, and the teeth $f$ of the pitcher descend past the hay which is gathered in between the set of teeth $g$ which are adjacent to the ground and the guides $i$. After the teeth of the pitcher have got past the charge of hay gathered up, the fingers $j$ strike the ends of levers K and release the wheels P, when the shaft $c$ rotates a quarter-turn, and the charge of hay gathered is lifted up into a horizontal position and another set of the teeth $g$ commences to rake. As soon as the charge has been lifted up the pitcher commences to ascend, and its teeth passing in between the teeth of the raker, lift the charge of hay, and, carrying it up and over in the arc of a circle, deposit it on the wagon. At each descent of the pitcher the arms J strike the arms H and wind up the mechanism for imparting the throw to the rake-shaft, as has been hereinbefore described.

The object of the mechanism for changing the speed of the pitcher (by a change of gears, as already explained) is to allow different periods of time for gathering a charge in the rake to suit different kinds of crops. It requires less time to or distance of travel to collect a charge when a heavy crop is lying on the ground than when a light crop is to be raked.

Having fully described the construction and operation of my machine for raking and pitching hay, what I claim therein as new, and desire to secure by Letters Patent, is—

1. The combination of the vibrating pitcher with a rotary rake having an intermittent motion, the whole arranged and operating substantially as described, for the purposes set forth.

2. The arms J and shipper-fingers $j$ on the pitcher, in combination with the retaining-levers K and springing vibrating-arms H, the whole constructed and arranged substantially as decribed, for the purpose of causing the rake to rotate automatically, for the purpose set forth.

3. In combination with the vibrating pitcher and automatically-rotated rake, the sliding gear or their equivalents for changing the speed of the pitcher, substantially as and for the purpose specified.

4. The hinged guides $i$, in combination with the intermittently-rotating rake-teeth $g$, arranged as and for the purpose specified.

5. In combination with the rotating self-shipping shaft $a$, the mechanism, specifically as hereinbefore set forth, for imparting to the pitcher the vibrating self-reversing motion, as and for the purpose described.

In testimony whereof I have hereunto set my hand and affixed my seal this 20th day of June, 1860.

A. J. PRESTON. [L. S.]

Witnesses:
HORACE G. PHELPS,
RANSOM CLARK.